United States Patent Office 2,945,757
Patented July 19, 1960

2,945,757
RECOVERY OF NOBLE METALS FROM CATALYTIC COMPOSITES

James Hoekstra, Evergreen Park, Ill., assignor, by mesne assignments, to Universal Oil Products Company, Des Plaines, Ill., a corporation of Delaware No Drawing. Filed Nov. 2, 1956, Ser. No. 619,940

16 Claims. (Cl. 75—121)

The present invention relates to the recovery of noble metals from noble metal-containing composites, and is specifically directed to the recovery of platinum from deactivated catalytic composites comprising platinum in combination with refractory inorganic oxides and other catalytic components.

Noble metal-containing catalysts are employed throughout commercial industries for promoting a multitude of reactions among which are cyclization, hydrogenation, dehydrogenation, isomerization, aromatization, sulphonation, dehydrocyclization, etc. After extensive periods of use, the catalytic composite employed usually becomes deactivated, and incapable of performing its intended function acceptably. Catalyst deactivation may result from substances which are peculiar to the particular catalyst used, a change in the physical state of the catalytic components, a loss of said components, or from the deposition of impurities, in the form of solids, which shield the catalytically-active surfaces from the materials being processed. Generally, the deposition of coke or other carbonaceous material is a direct cause of catalyst deactivation, and usually occurs in combination with one of the previously mentioned causes of catalyst deactivation.

The coke and other carbonaceous material is frequently removed by burning the deactivated catalyst in a free oxygen-containing medium which, to all appearances, has the effect of producing an active catalyst. Other, more recent, methods used in conjunction with air-oxidation of the deactivated catalyst revert the catalytic components to their most active state, and produce catalysts which are nearly identical in composition and activity to the catalyst before used.

Each regeneration, however, generally produces a catalyst of somewhat lower activity than the catalyst prior to use, and which functions acceptably for a shorter period of time than the catalyst resulting from the preceding regeneration. Eventually it becomes necessary to replace the catalyst with a new, unused portion of catalyst, regeneration having become uneconomically justifiable. The high cost of the noble metal component does not permit discarding the catalytic composite per se, even though the concentration of the noble metal is relatively low when compared to the concentration of the other components.

The present invention is directed to the recovery of noble metals from noble metal-containing catalytic composites which can no longer be regenerated economically.

As hereinbefore mentioned, metal-containing catalysts are extensively employed in commercial industries. Recent discoveries in the field of catalysis have made possible highly active catalytic composites which comprise small quantities of noble and precious metals. Although extremely small percentages, from about 0.01% to about 1% by weight of the noble metal, are employed, the high cost of such metals warrants their recovery, and subsequent reuse in the manufacture of new, fresh catalysts.

Although the method of the present invention is specifically directed to the recovery of platinum from deactivated platinum-containing catalytic composites, it may be advantageously employed to recover other noble and precious metals such as iridium, osmium, palladium, rhodium, rhenium, ruthenium, silver and gold, and especially palladium.

The metals previously described are generally composited with an inert refractory inorganic oxide such as alumina, zirconia, silica, magnesia, thoria, etc. Mixtures of two or more of these refractory inorganic oxides may be employed such as silica-alumina, silica-zirconia, silica-alumina-zirconia, etc. It is understood that these refractory inorganic oxides may be made in any suitable method including separate, successive or coprecipitation methods of manufacture.

Other catalytic components may be composited with the refractory inorganic oxide, in addition to the metals previously described. Other metals such as iron, tungsten, sodium, nickel, cobalt, molybdenum, copper, chromium, mixtures of the same, etc., may be added to the catalytic composite. Halogen may also be composited with the refractory inorganic oxide, and is generally deposited therewith as the halide of one or more of the metals hereinbefore set forth. Similarly, sulfides, nitrates, oxides, and other metallic salts may be present.

One method in which the noble metal may be recovered is by treating the noble metal-containing composite with a suitable acid or alkali to dissolve the refractory inorganic oxide, and to free the noble metal in a finely divided or colloidal state. This method is satisfactory where the process in which the catalyst is ultimately used does not require a substantially pure catalyst and the presence of impurities, therefore, is not too detrimental. On the other hand, it is an important requirement that certain noble metal-containing catalysts be substantially free from impurities, and in such cases it is necessary to further separate the precipitated noble metal from these impurities. This separation is generally effected by dissolving the impurities, utilizing a strong acid or alkali as before, but it has been found that some of the noble metal dissolves. The use of sulfuric or nitric acid effects complete dissolution of the refractory inorganic oxide, however, resulting in the recovery of said refractory inorganic material as either the sulfate or the nitrate. Experience has shown that the sulfate and the nitrate are not highly suitable for use as a source of the refractory inorganic material in the preparation of new catalysts. The method of the present invention, however, utilizes hydrochloric acid which dissolves the refractory inorganic material forming the chlorine. It has been shown that metallic chlorides are more suitable as the source of the refractory inorganic material than either the sulfate or the nitrate. Heretofore, however, the use of hydrochloric acid could not be economically justified since a portion of the noble metal would also be dissolved therein. Conversely, if hydrochloric acid were employed in such concentration that no platinum were dissolved, not all of the refractory inorganic oxide would be removed, and the noble metal would continue to be contaminated with these materials.

It is an object of the present invention to provide a method which utilizes hydrochloric acid thereby forming the halide of the refractory inorganic material without dissolving any of the noble metal composited therewith. The method involves the addition of a suitable reducing agent. A further object is to revert the refractory inorganic oxide to a form which is highly suitable as a source of the refractory material in preparing new catalyst while simultaneously recovering the noble metal in a substantially pure, highly concentrated state.

In one embodiment, the present invention relates to a method for recovering a noble metal from a noble metal-refractory inorganic oxide composite which comprises reacting said composite with hydrochloric acid in the presence of a reducing agent.

In another embodiment, the present invention provides a method for recovering a noble metal from a noble metal refractory inorganic oxide composite which comprises reacting said composite with hydrochloric acid in the presence of an organic reducing agent, maintaining the reaction mixture at a temperature in excess of 130° C. and at superasmospheric pressures thereby dissolving the refractory inorganic oxide and separating the resulting solution from the undissolved noble metal.

In a specific embodiment, the present invention provides a method for recovering platinum from a platinum-alumina composite which comprises subjecting said composite to air-oxidation at a temperature of from about 800° F. to about 1200° F., reacting the resulting air-oxidized composite with an aqueous solution of from about 20% to about 50% by weight of hydrogen chloride in an amount of from about 91% to about 104% of the theoretical amount necessary to dissolve all the refractory inorganic oxide, in the presence of from about 1 to about 5 equivalents of an organic reducing agent per equivalent of platinum, maintaining the mixture at a temperaure in excess of 130° C. and at superatmospheric pressure, thereby dissolving the refractory inorganic oxide and separating the resulting solution from the undissolved platinum.

The process of the present invention relates to the recovery of noble metals and is specifically directed to the recovery of noble metals from a deactivated catalytic composite. However, in the interest of simplicity, the following description will be directed to the recovery of platinum from a deactivated platinum-alumina catalytic composite which may or may not contain other metallic components and/or combined halogen.

Such a catalytic composite may be made in any suitable manner including separate successive or coprecipitation methods of manufacture. Typical of the many methods available, for the manufacture of platinum-alumina catalytic composites, is to add a suitable alkaline precipitant such as ammonium hydroxide to a solution of a salt of aluminum thereby precipitating alumina. The platinum may be added in any suitable manner such as commingling chloroplatinic acid solution with a solution of the aluminum salt, and adding thereto an alkaline precipitant such as ammonium hydroxide. The resulting precipitate is then filtered, dried and subsequently formed into any desired shape such as pills, powder, granules, etc., if the alumina is not already in the desired shape.

Although any aluminum salt may be employed as the source of alumina, aluminum chloride affords many advantages not particularly offered by other aluminum salts. For example, an alumina prepared from the chloride is easily filtered and the resulting filter cake contains large amounts of solid material; also, if it is desired that the final catalytic composite comprises halogen as the chloride, the use of aluminum chloride affords a convenient method for depositing such halogen onto the final catalytic composite. The method of the present invention recovers aluminum as aluminum chloride, thereby offering added economical advantages which were heretofore not obtained.

As hereinbefore set forth, the present invention employs hydrochloric acid to dissolve the refractory inorganic oxide such as alumina. Usually from about 20% to about 40% by weight of the available platinum would also be dissolved in the hydrochloric acid. However, I have discovered that the addition of a reducing agent to the noble metal-refractory inorganic oxide composite substantially reduces, and in particular instances prevents, dissolution of the platinum. Any suitable reducing agent, either organic or inorganic, may be advantageously employed. Organic reducing agents are preferred in order to avoid introducing metallic impurities into the reaction mixture such as is probable when most inorganic reducing agents are employed. In some instances, however, it may be desired to employ an inorganic reducing agent, in which instances, any metallic impurities so introduced can be removed by any suitable method including subsequent digestion, ion exchange systems, etc. Some reducing agents such as hydrazine, hydrazine hydrochloride, hydroxylamine and hydroxylamine hydrochloride may be employed to decrease the degree of platinum dissolution without the tendency to deposit metallic contaminants within the reaction mixture.

Any suitable organic reducing agent may be advantageously utilized, although not with equivalent results. Organic reducing agents such as formaldehyde, acetaldehyde, formic acid, propionic acid, acetic acid, catechol, resorcinol, hydroquinone, benzaldehyde, pyrogallol, and other aldehydes, phenols, organic acids and amino-phenols may be used. I have found that hydroquinone and/or formic acid are preferred. No portion of the available platinum will be dissolved by the hydrochloric acid when either hydroquinone or formic acid is employed as the organic reducing agent. Hydroquinone, however, is particularly preferred since not only does it inhibit the dissolution of the platinum, but also effects the forming of platinum into large agglomerates of undissolved material. These large agglomerates of platinum afford greater ease in the recovery of pure platinum therefrom and tend to reduce the loss of platinum particles while separating said particles from the resulting solution of aluminum chloride and other impurities.

The undissolved platinum-containing agglomerates are conveniently separated from the resulting solution by such methods which include decanting the supernatant liquid from said agglomerates, filtering, centrifugal separation, etc. The agglomerates are then filtered and washed with distilled water to recover therefrom a material which is substantially pure platinum. The supernatant solution containing aluminum chloride and other dissolved salts of the metallic contaminants present in the catalytic composite can be likewise treated in any suitable manner to recover the aluminum chloride in a pure form which is readily adaptable as a source of alumina in the preparation of new catalysts.

The method of the present invention employs an aqueous solution of from about 20% to about 50% by weight of hydrogen chloride. A range of from about 35% to about 45% by weight of hydrogen chloride is preferred and is employed in definite quantities to afford the greatest advantage. I have found that the hydrochloric acid is most advantageously utilized in amounts of from about 91% to about 104% of the amount that is theoretically necessary to dissolve all the inorganic oxide. It is preferred, however, to have 100% of the theoretical amount of hydrogen chloride.

The quantity of the reducing agent is dependent upon the concentration of platinum in the catalytic composite from which said platinum is to be recovered, and is employed in any amount in excess of one equivalent of the reducing agent per equivalent of platinum. However, the reducing agent should not be employed in such excessive quantities as would make its use uneconomical. Hydroquinone and formic acid are the preferred organic reducing agents although formaldehyde and pyrogallol may be advantageously employed, not necessarily with equivalent results. Hydroquinone is particularly preferred due to its flocculating action which produces relatively large platinum agglomerates, thereby facilitating the separation of the solution from the undissolved platinum.

It is preferred to remove as many of the contaminants from the catalytic composite as possible prior to employing the method of the present invention provided, however, the treatments employed for such removal do not enhance or afford the loss of platinum particles. Generally, a deactivated catalytic composite contains metallic impurities in addition to coke and other carbonaceous material. Such metallic impurities may be removed by washing with distilled water. The deactivated catalytic composite may be subjected to air oxidation to remove the coke and other carbonaceous material. The oxidation treatment may employ any suitable free oxygen-containing gaseous material. Air is preferred due to its natural abundance and the economical advantage afforded through its utilization. The oxidation is usually effected at a temperature of from about 600° F. to about 1400° F., however, a temperature within the range of from about 800° F. to about 1200° F. is preferred. The metallic contaminants previously described may also be removed thereby if said metallic contaminants have not been removed prior to the air oxidation treatment. It is understood that such treatments may either precede or follow the method of the present invention and do not, therefore, unduly limit the same.

In the preferred embodiment, a deactivated platinum-alumina catalytic composite which may or may not contain other metallic components and/or combined halogen is subjected to air oxidation to remove the coke and carbonaceous material. The resulting coke-free composite is then thoroughly washed with distilled water to remove the soluble salts of other metallic contaminants. An organic reducing agent is added to the resulting alumina-platinum composite in an amount in excess of one equivalent of organic reducing agent per equivalent of platinum, said amount not being so great as to be uneconomical. The resulting mixture is then reacted with an aqueous solution of from about 35% to about 45% by weight of hydrogen chloride in an amount of from about 91% to about 104% of the quantity which is theoretically required to dissolve all the alumina. The reaction mixture is maintained at a temperature in excess of 130° C. and at superatmospheric pressure. Superatmospheric pressure is denoted as any pressure in excess of 14.7 p.s.i.g. and is that pressure which is required to maintain the reaction mixture in the liquid state at the selected temperature. When all of the alumina has been dissolved the mixture is allowed to cool and the pressure is released.

The resulting solution is separated from the undissolved platinum agglomerates by decanting therefrom and is then treated by any suitable method to recover pure aluminum chloride which may subsequently be utilized as a source of alumina in the preparation of new catalyst.

The large agglomerates of platinum are washed with distilled water to remove all further traces of soluble material. The platinum particles may then be subjected to air oxidation to remove coke and other carbonaceous material, if such has not previously been removed. The final traces of metallic contaminants may be removed by ion exchange or any other suitable method which results in a concentrated pure platinum readily adaptable for further use as a catalytic component.

The following examples are introduced to further illustrate the utility of the present invention. It is not intended to limit the present invention to the materials, concentrations and/or conditions employed. The portions of deactivated catalyst utilized in these examples were obtained from a large quantity of commercially used catalyst which had been employed in the reforming of straight-run and catalytically-cracked gasolines to high-octane motor fuel.

EXAMPLE I 50 grams of a commercially deactivated, platinum-alumina catalyst were subjected to air-oxidation at a temperature of about 1000° F. to remove deposits of coke and other carbonaceous material. The air-oxidized catalyst was then placed in a rotating autoclave, and covered with an aqueous solution of 37% by weight of hydrogen chloride in an amount equivalent to 105% of the theoretical quantity necessary to dissolve all of the alumina contained in the catalyst. The temperature of the mixture was maintained at 150° C., and a pressuer of 50 atmospheres was imposed thereon. These conditions were maintained for a period of three hours after which time the reaction mixture was cooled and the pressure released.

The resulting solution was decanted from the undissolved material, and subsequently mixed with the wash water used to wash the undissolved material, and the resulting mixture was analyzed for the concentration of platinum therein. The undissolved material was dried and subjected to analysis to determine the quantity of alumina which had not been dissolved.

The above-described procedure was repeated utilizing 100% of the theoretical quantity of the 37% by weight solution of hydrogen chloride, and repeated a second time employing 100% of the theoretical amount of the hydrogen chloride solution while maintaining the temperature of the reaction mixture at 125° C., all other conditions remaining the same. The undissolved material in each instance was analyzed for the content of undissolved alumina, and the resulting solutions for platinum concentration.

The results of the analyses are given in the following Table I, which indicates the criticality of the quantity of hydrogen chloride employed, and the temperature at which the reaction mixture is maintained.

*Table I*

| | | | |
|---|---|---|---|
| HCl, percent of theoretical | 105 | 100 | 100 |
| Temperature, °C | 150 | 150 | 125 |
| Alumina dissolved, wt. percent | 100 | 100 | 100 |
| Platinum dissolved, wt. percent | 34 | 25 | 27 |

It is readily ascertained by Example I that the use of too large an amount of hydrochloric acid results in the dissolution of a large quantity of platinum, and that a like effect is obtained if the temperature at which the reaction mixture is maintained is lowered.

EXAMPLE II

The procedure as outlined in Example I was repeated using 100% of the theoretical amount of hydrogen chloride solution necessary to dissolve all the alumina contained in a 50-gram portion of the deactivated, air-oxidized catalyst. The temperature of the reaction mixture was maintained at 125 C. for a period of one hour: the other conditions remained the same. The procedure was repeated a second time using 90% of the theoretical amount of hydrochloric acid: the temperature was maintained at 150° C. for one hour. All other conditions were identical to those employed previously.

The results of the analyses for alumina and platinum dissolution are given in the following Table II, which illustrates, again, the effect of the quantity of hydrochloric acid employed, and the necessity for a lengthy reaction time in the absence of a suitable organic reducing agent.

*Table II*

| | | |
|---|---|---|
| HCl, percent of theoretical | 100 | 90 |
| Temperature, °C | 125 | 150 |
| Alumina dissolved, wt. percent | 97.5 | 97.5 |
| Platinum dissolved, wt. percent | 26 | 24 |

Example II illustrates that either a reduction in the quantity of hydrogen chloride, or in the reaction time is detrimental to complete dissolution of the alumina, and no substantial decrease in platinum dissolution is realized.

EXAMPLE III 50 grams of the commercially deactivated catalyst were subjected to air oxidation at a temperature of 1000° F. to remove deposits of coke and other carbonaceous material. The air oxidized catalyst was then placed in a rotating autoclave, and 25 milliliters of an aqueous solution of 37% by weight formaldehyde (135 equivalents of formaldehyde per equivalent of platinum) was added thereto. To the resulting mixture was added an aqueous solution of 37% by weight of hydrogen chloride in an amount equivalent to 100% of the theoretical quantity necessary to dissolve all of the alumina contained in the catalyst. The temperature of the mixture was maintained at 150° C., and a pressure of 50 atmospheres was imposed thereon. These conditions were maintained for a period of one hour, after which time the reaction mixture was cooled and the pressure released.

The resulting solution was decanted from the undissolved material, and subsequently mixed with the wash water used to wash the undissolved material, and the resulting mixture was analyzed for the concentration of platinum therein. The undissolved material was dried and subjected to analysis to determine the quantity of alumina which had not been dissolved.

The above-described procedure was repeated using 0.2 milliliter of the aqueous solution of 37% by weight formaldehyde (about 1 equivalent per equivalent of platinum), all other conditions remaining the same, and repeated a second time utilizing 105% of the theoretical amount of hydrochloric acid, and 0.4 milliliter of the aqueous solution of 37% by weight of formaldehyde (2 equivalents per equivalent of platinum), while maintaining the reaction mixture at 125° C., all other conditions remaining the same. The undissolved material in each instance was analyzed for the concentration of alumina, and the resulting solutions for platinum concentration.

The results of the analyses are given in the following Table III which indicates the benefits to be derived by the method of the present invention.

*Table III*

| | | | |
|---|---|---|---|
| HCl, percent of theoretical | 100 | 100 | 105 |
| Formaldehyde concentration, equivalents/ equivalent of Pt | 135 | 1 | 2 |
| Temperature, ° C | 150 | 150 | 125 |
| Alumina dissolved, wt. percent | 100 | 100 | 97.5 |
| Platinum dissolved, wt. percent | 0.3 | 0.2 | 5.5 |

Example III illustrates the substantial benefits derived through the utilization of an organic reducing agent to prevent dissolution of platinum. Also, the criticality of the quantity of hydrogen chloride, and the temperature at which the reaction is maintained is revealed.

EXAMPLE IV

The procedure of Example III was repeated utilizing 0.14 gram of hydrazine hydrochloride (2 equivalents per equivalent of platinum), all other conditions remaining the same. The analysis of the resulting solution indicated that 8.6% by weight of the total platinum was dissolved, while 100% by weight of the alumina was dissolved as indicated by an analysis of the undissolved material.

EXAMPLE V

The procedure of Example II was repeated using 0.7 milliliter of an aqueous solution of 25% by weight of formic acid (2 equivalents per equivalent of platinum), all other conditions remaining the same, and repeated a second time utilizing 0.44 gram of hydraquinone (2 equivalents per equivalent of platinum), again, all other conditions remaining the same. The undissolved material in each instance was analyzed to determine the quantity of alumina contained therein, and the resulting solutions were analyzed for the concentration of platinum.

The result of the analyses are given in the following Table IV, and indicate the benefits derived through the use of either formic acid or hydroquinone as the organic reducing agent.

*Table IV*

| Organic Reducing Agent | Formic Acid | Hydroquinone |
|---|---|---|
| HCl, percent of theoretical | 100 | 100 |
| Temperature, ° C | 150 | 150 |
| Equivalents of organic reducing agent/equivalent of Pt | 2 | 2 |
| Alumina dissolved, wt. percent | 100 | 100 |
| Platinum dissolved, wt. percent | 0 | 0 |

An unexpected result was evidenced when the relative size of the platinum particles resulting from the treatments which utilized formic acid and hydroquinone were compared. The particles formed during treatment with the latter were substantially larger than those obtained from the former. This was apparently due to a particular flocculating action possessed by hydroquinone while preventing the dissolution of the platinum. This is an added advantage, since the larger particles are more easily separated and washed of soluble matter, and the tendency to lose particles of the expensive platinum in subsequent processing is substantially decreased.

The foregoing examples and specification clearly illustrate the benefits derived from the method of the present invention whereby hydrochloric acid may be employed in the recovery of noble metals without dissolution of the noble metal.

I claim as my invention:

1. A method for recovering a noble metal from a noble metal-refractory inorganic oxide composite which comprises dissolving the inorganic oxide out of the composite with hydrochloric acid in the presence of an organic reducing agent in sufficient amount to prevent dissolution of the noble metal, and separating the resulting solution from the undissolved noble metal.

2. The method of claim 1 further characterized in that said reducing agent comprises hydroquinone.

3. The method of claim 1 further characterized in that said reducing agent comprises formic acid.

4. The method of claim 1 further characterized in that said reducing agent comprises formaldehyde.

5. The method of claim 1 further characterized in that said reducing agent comprises hydrazine hydrochloride.

6. The method of claim 1 further characterized in that said hydrochloric acid comprises an aqueous solution of from about 20% to about 50% by weight of hydrogen chloride.

7. The method of claim 1 further characterized in that said composite is reacted with hydrochloric acid in an amount of from about 91% to about 104% of the theoretical amount necessary to dissolve all the refractory inorganic oxide.

8. The method of claim 1 further characterized in that said reducing agent is present in an amount in excess of one equivalent of the organic reducing agent per equivalent of the noble metal.

9. A method for recovering platinum from a platinum-refractory inorganic oxide composite which comprises dissolving the inorganic oxide out of said composite with hydrochloric acid in the presence of an organic reducing agent in sufficient amount to prevent dissolution of the platinum, and separating the undissolved platinum from the resultant solution.

10. The method of claim 9 further characterized in that said refractory inorganic oxide comprises alumina.

11. A method for recovering a noble metal from a noble metal-refractory inorganic oxide composite which comprises dissolving the inorganic oxide out of the composite with hydrochloric acid in the presence of an organic reducing agent in sufficient amount to prevent dissolution of the noble metal, maintaining the reaction mixture at a temperature in excess of 130° C. and at superatmospheric pressure, and separating the resulting solution from the undissolved noble metal.

12. A method for recovering platinum from a platinum-alumina composite which comprises dissolving alumina out of said composite with an aqueous solution of from about 20% to about 50% by weight of hydrogen chloride in an amount of from about 91% to about 104% of the theoretical amount necessary to dissolve all of the alumina, in the presence of an organic reducing agent in excess of one equivalent of said organic reducing agent per equivalent of platinum, maintaining the reaction mixture at a temperature in excess of 130° C. and at superatmospheric pressure, thereby dissolving the alumina without dissolving the platinum, and separating the resulting solution from the undissolved platinum.

13. The method of claim 12 further characterized in that said organic reducing agent comprises hydroquinone.

14. The method of claim 12 further characterized in that said organic reducing agent comprises formic acid.

15. The method of claim 12 further characterized in that said organic reducing agent comprises formaldehyde.

16. A method for recovering platinum from a platinum-alumina composite which comprises dissolving alumina out of said composite with an aqueous solution of from about 20% to about 50% by weight of hydrogen chloride in an amount of from about 91% to about 104% of the theoretical amount necessary to dissolve all of the alumina, in the presence of hydrazine hydrochloride in excess of one equivalent of said organic reducing agent per equivalent of platinum, maintaining the reaction mixture at a temperature in excess of 130° C. and at superatmospheric pressure, thereby dissolving the alumina without dissolving the platinum, and separating the resulting solution from the undissolved platinum.

References Cited in the file of this patent

UNITED STATES PATENTS

| | | |
|---|---|---|
| 2,710,799 | Leopard | June 14, 1955 |
| 2,787,540 | Appell | Apr. 2, 1957 |
| 2,863,760 | Ashley et al. | Dec. 9, 1958 |
| 2,863,761 | Ashley et al. | Dec. 9, 1958 |
| 2,863,762 | Pullen | Dec. 9, 1958 |

OTHER REFERENCES

"A Comprehensive Treatise on Inorganic and Theoretical Chemistry," Mellor, vol. 16, page 150 relied on.